July 9, 1940.  R. S. SMITH  2,207,274

FLUID FLOW MECHANISM

Original Filed Oct. 15, 1934    4 Sheets-Sheet 1

Inventor.
Reuben Stanley Smith.

Attorney.

July 9, 1940.  R. S. SMITH  2,207,274
FLUID FLOW MECHANISM
Original Filed Oct. 15, 1934  4 Sheets-Sheet 2

Inventor:
Reuben Stanley Smith.
Attorney.

July 9, 1940. R. S. SMITH 2,207,274
FLUID FLOW MECHANISM
Original Filed Oct. 15, 1934 4 Sheets-Sheet 3

Inventor.
Reuben Stanley Smith.
Attorney.

Patented July 9, 1940

2,207,274

UNITED STATES PATENT OFFICE 2,207,274

FLUID FLOW MECHANISM

Reuben Stanley Smith, Altadena, Calif., assignor to Smith Meter Company, a corporation of California Original application October 15, 1934, Serial No. 748,342. Divided and this application July 16, 1938, Serial No. 219,621

18 Claims. (Cl. 73—259)

This invention relates to fluid flow mechanisms adapted for use, for instance, as meters for measuring the volumetric flow of fluids.

The instant application is a division of my copending application filed October 15, 1934, Ser. No. 748,342 on Fluid flow mechanism, which, in turn, is a continuation, in part, of my application filed May 29, 1933, Ser. No. 673,431 on Fluid flow mechanism.

In said copending application Ser. No. 748,342, certain broader claims are drawn to the vertical support of the rotor so it may be adjusted vertically with respect to the casing or the spring-support of the rotor so it is yieldably urged vertically upwardly with respect to the casing. The specific claims to these features in said copending application, are limited to structures wherein this relative movement of the rotor with respect to the casing is rendered possible by mounting the rotor shaft so it is vertically shiftable, the spring-support, where it is included as a feature, being applied between the casing and shaft.

As distinguished from these specific claims, the claims in the instant application, drawn to these features, are limited to structures wherein the relative vertical movement of the rotor with respect to the casing is rendered possible by mounting the rotor so it is vertically shiftable with respect to the shaft, the spring-support, where it is included as a feature, being applied between the rotor and shaft.

It is among the general objects of the invention to provide a fluid flow mechanism which shall operate with a minimum amount of friction and wear, an obvious advantage whether the device be used as a meter or motor. However, without intending to limit my broader claims thereto, the invention is herein illustrated and described as a meter mechanism particularly well adapted for use in metering highly volatile fluids such as gasoline. In this connection, it is my general object to provide an extremely accurate metering mechanism.

The nature of the invention is such that further objects and features of novelty and advantage may be treated to better advantage as the detailed description progresses. Reference will be made to the accompanying drawings, in which:

The meter housing or casing is generally indicated at 10 and includes an annular body member or barrel 11 and end plates or closures 12 and 13. Since, for reasons to be made apparent, it is desirable that the meter be positioned with its rotor axis extending vertically, I will individually term plate 12 a cap or cover member and plate 13 a base member. However, this terminology is not to be considered as limitative on the invention except as to such claims as specifically call for these particularities. It is further to be noted that where, in my claims, I refer to certain relationships between the rotor and parts integral with the casing, that reference is to be construed as including situations where the parts may be separate from but associated with the casing, unless it is otherwise indicated in particular claims.

Barrel 11 is flanged at 14 and plates 12, 13 are flanged at 15 to take bolts 16 whereby the casing parts are held in assembly.

As will appear, it is important that the opposed faces 18 and 19 of plates 12 and 13, respectively, be maintained accurately in predetermined spaced relation, and, of course, the joint between the barrel and end plates must be fluid-tight. Accordingly, flanges 15 are brought tightly down on flanges 14 to set faces 18 and 19 with the predetermined spacing, while gaskets 17, interposed between flanges 14 and 15 are of such thickness that they may be compressed sufficiently to allow this contact and yet insure a fluid-tight joint. Gasket 17 is fitted in the groove 4 sunk in the inner face of flange 15 (Fig. 2) the fit being such that the gasket will come off with the cover when the latter is removed. Clearance grooves 5 and 6 are cut in the opposed face of flange 14, groove 6 extending to the inner peripheral face of annulus 11, though the corner is preferably chamfered as at 7, while groove 5 extends radially beyond each side of annular shoulder 8 defining the outer extent of groove 4. Any excess packing in groove 4 will be taken in clearance grooves 5 and 6 when the housing parts are initially assembled, assuring that the outer extent of the flanges may come into metal-to-metal contact and thus definitely space faces 18 and 19. Likewise, these grooves are adapted to receive the mutilated or mashed edges of the packing which may result from removal of the cover, though the chamfer 7 and grooves 5, 6 together with the recessing of the gasket into the underface of flange 15 practically eliminates the danger of damage to the gasket during cover removal.

Face 19 is annular, as viewed in plan, (Fig. 5) the base within that annulus being depressed to form a settling chamber 21 defined by substantially vertical wall 22 and conical wall 23.

Figures 1, 2:
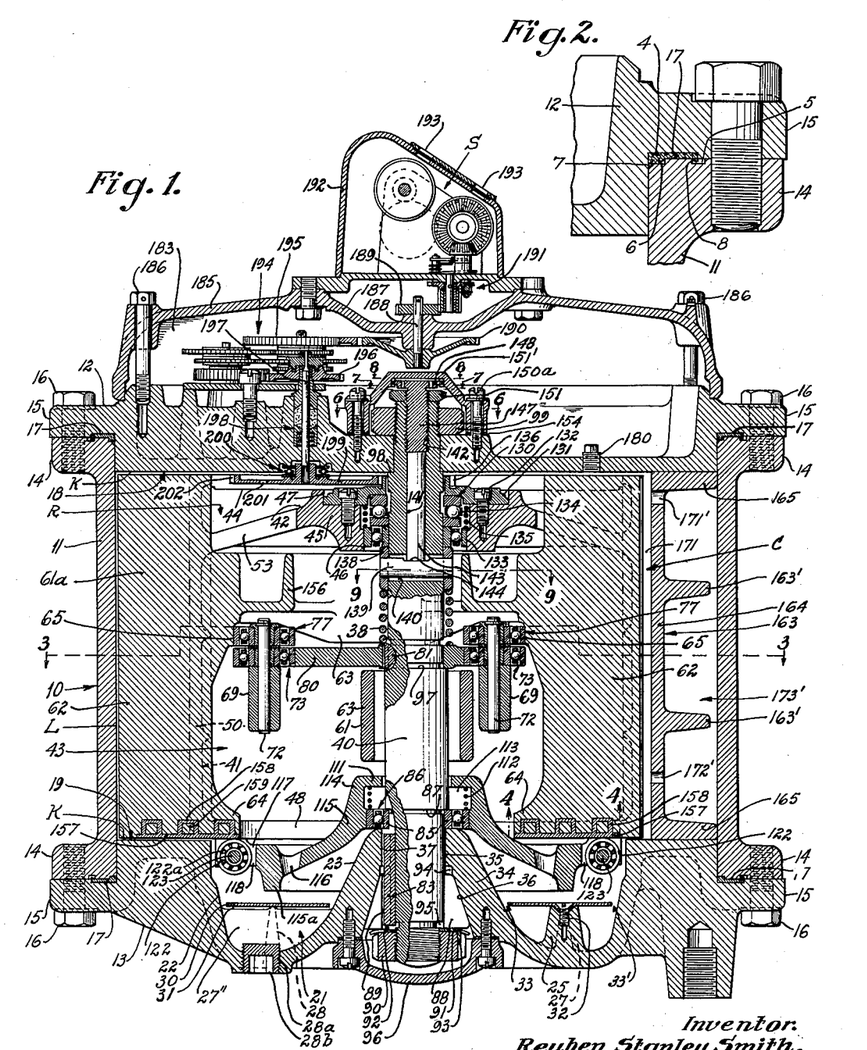
Fig. 1 is a medial, vertical section of a fluid flow mechanism embodying my invention.
Fig. 2 is an enlarged fragmental section of the housing gasket shown in Fig. 1.
Figure 5:
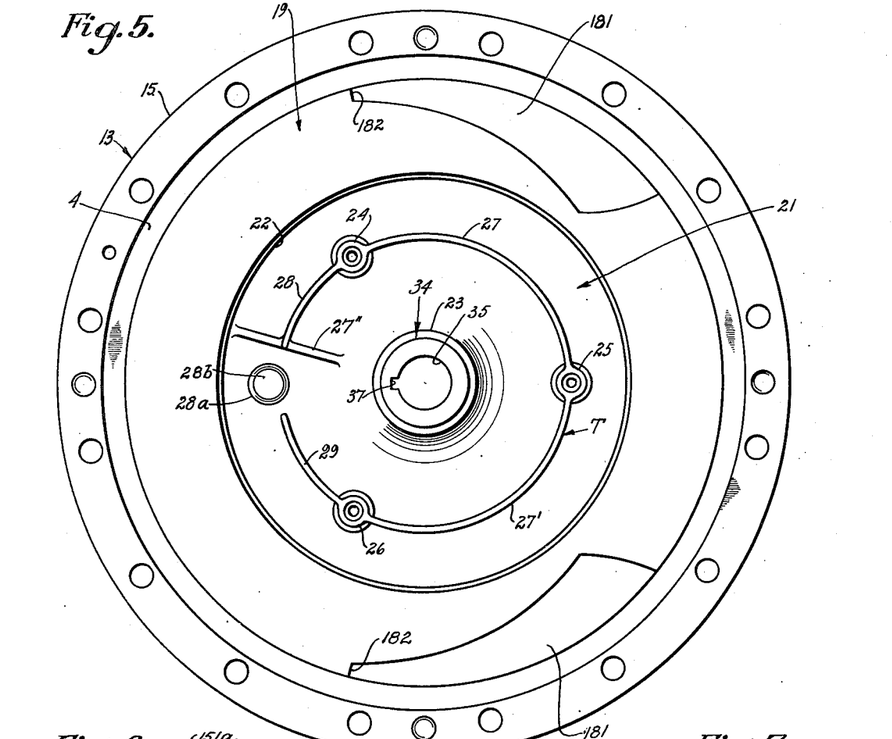
Fig. 5 is a detached, top plan view of the housing base of Fig. 1.

Extending upwardly from base 19 into settling chamber 21 are spaced bosses 24, 25 and 26 (Figs. 1 and 5). Vertical rib 27 connects bosses 24 and 25, while rib 27' connects bosses 25 and 26. A short radial rib 27'' extends from hub 34 to wall 22, a rib 28 connecting this cross-partition with boss 24. Extending from boss 26 toward but stopping short of cross rib 27'', is a rib 29, a drain port 28a closed by plug 28b being disposed between the end of rib 29 and rib 27''.

An annular baffle plate or settling-chamber cover 30 is disposed on top the bosses and partition T formed by the several ribs which extend substantially centrally through the annular settling chamber, it being noted by reference to Fig. 1 that cross rib 27'' is a little lower than the other ribs to provide clearance space 31 beneath the cover 30. Cover 30 is held in position by flush-head screws 32, the positioning being such that there are provided slight annular clearances 33 and 33' between the cover and settling-chamber walls 23 and 22, respectively.

Extraneous matter in the fluid within the rotor (to be described) finds its way into the settling chamber through clearances 33 and 33', falling to the bottom of that chamber. Thereafter the fluid swirling beneath the rotor is prevented from picking up this matter and returning it to the rotor assembly. Any tendency of the swirling fluid to set up cross currents in the settling chamber, and thus carry out the debris, is checked by partition T, while partition 27'' checks the tendency of the fluid to swirl circumferentially of hub 34 beneath the settling chamber cover 30.

Base wall 23 defines a central hub 34 having a bore 35 and a conical counter-bore 36, keyway 37 being sunk in the wall of bore 35. Bore 35 is adapted to take the lower end of the cam shaft 40 in a manner later to be described, upon which shaft the rotor assembly or impeller mechanism, generally indicated at R, is mounted.

As will appear, the rotor, cam shaft, rotor blades, operating cam, etc., may be assembled to form a rotor unit which is capable of bodily insertion in or removed from housing 10 when cover 12 is detached. Accordingly, I will first set forth the make-up of that unit.

Figure 3:
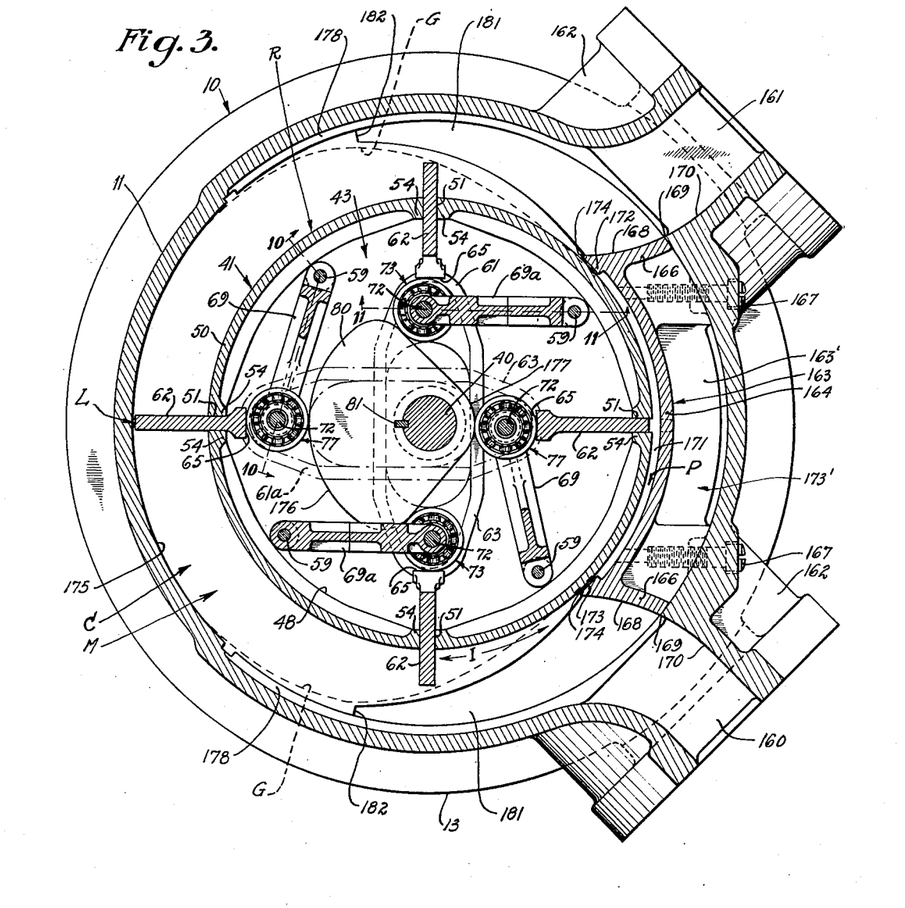
Fig. 3 is a section on line 3—3 of Fig. 1.
Figure 10:
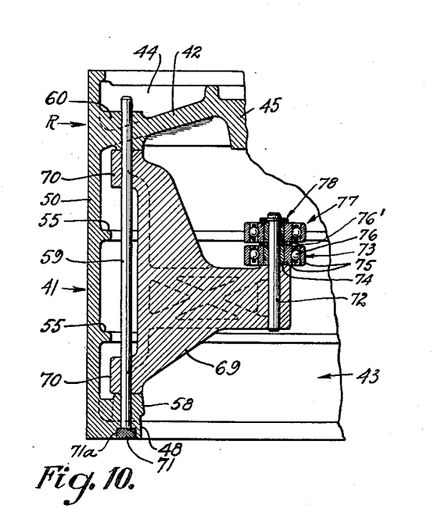
Fig. 10 is a section on line 10—10 of Fig. 3.

Referring to Figs. 1, 3 and 10 it will be seen that the rotor includes an annular body member or carrier 41 (preferably, though not necessarily, of cast aluminum) having a downwardly and outwardly inclining web 42 extending across the bore 43 thereof at a point spaced downwardly from its upper end, the web being ribbed at 44 and supporting a hub 45 which has a bore 46 and a counterbore 47. The described location of the web provides, in effect, a recess at the upper end of the body to allow the interposition of a gear (later to be identified) between the rotor and cover 12. The conical characteristics of web 42 contribute to its efficiency in stiffening the body member and resisting the tendency of its split side-walls to be relatively displaced in a vertical direction.

Figure 12:
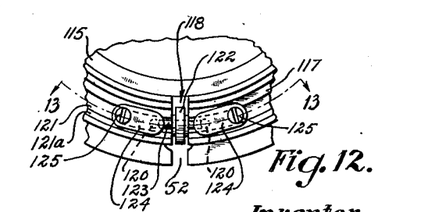
Fig. 12 is a fragmentary, bottom plan view of the roller support for the blade-unit of Fig. 1.

An in-turned flange 48 is provided at the lower end of the body member. The annular wall 50 of annulus or body member 41 has four radial slots 51, equally spaced apart and extending from top to bottom, flange 48 and web 42 having slots 52 (Fig. 12) and 53 (Fig. 1) respectively, which register with opposite ends of slots 51. However, slots 52, 53 may be somewhat wider than slots 51 to provide for greater blade-clearance. Internal ribs 54 extend vertically along wall 50 adjacent the slots, serving not only to strengthen the structure at these points but also to increase the extent of surface presented to the side faces of the blades which play through these slots, as will be described. Horizontally extending, annular ribs 55 further strengthen the structure.

Figure 11:
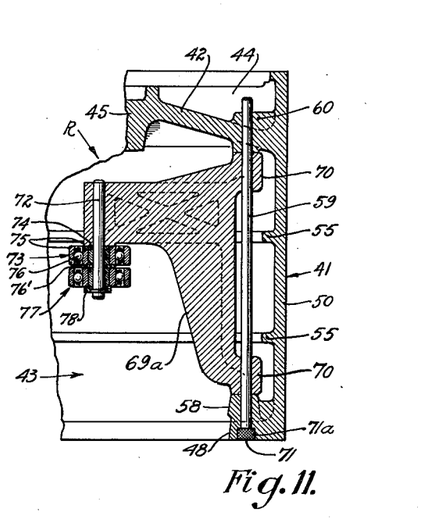
Fig. 11 is a section on line 11—11 of Fig. 3.

Midway between each pair of slots 52, flange 48 has a raised boss 58 which is drilled to receive a removable hinge-pin 59 (Figs. 10 and 11) adapted to project into the alined bore of boss 60 which extends downwardly from web 42.

There are provided two blade units generally designated at 61 and 61a, (Figs. 1 and 3), each unit embodying a pair of blades 62 connected by yoke 63, the lower ends of the blades being extended inwardly or towards each other as at 64. The two blade units are individually fashioned so that the yokes thereof will be spaced apart vertically and lie at opposite sides of section line 3—3 of Fig. 1 when, with their extended ends 64 facing downwardly in both cases, they are assembled in the rotor body. Otherwise, they are substantially alike.

Each blade unit has a pair of opposed shoulders 65 adjacent the inner edges of the blades and extending vertically from yoke 63. Said shoulders preferably are arcuate, as viewed in plan, being struck about the yoke axis as a center. Preferably, though not necessarily, the units are of cast aluminum, giving them requisite strength with desirable lightness.

Mounted for pivotal movement on spindles 59, are two rock arms 69 and two rock arms 69a, the diametrically opposite arms 69 being adapted to coact with blade unit 61a and diametrically opposite arms 69a being adapted to coact with blade unit 61. The vertically spaced and drilled lugs 70 of the rock arms are fitted between bosses 58 and 60, through which lugs and bosses the spindles 59 are thrust. The knurled ends 71 on spindles 59 frictionally grip the walls of the recesses 71a in which they seat, in order to prevent the spindles from vertical dislodgement, though the spindles may be wilfully dislodged for purposes of arm-disassembly, by tapping their upper ends where they extend above web 42. The application of a removable cap (to be described) to the lower end of the rotor, also serves to prevent the spindles from accidentally dropping out of place.

Cast into the free ends of each rock arm is a stub shaft or spindle 72 upon which an antifriction roller assembly 73 is mounted, this assembly consisting of bushing 74 surrounded by races 75 and balls 76. Engaging the inner race is a spacing bearing washer 76' (Figs. 10 and 11) which, in turn, opposes an anti-friction roller assembly 77 similar to assembly 73 but capable of rotation independently thereof. The two rollers on a given spindle are retained against dislodgement therefrom by wire-and-ring retainer 78. For purposes of later distinction, roller assemblies 73 will be termed "cam rollers" or "followers," and roller assemblies 77 will be termed "shuttle rollers."

It will be noted that while the spindles 72 of arms 69 extend upwardly therefrom and the spindles of arms 69a extend downwardly therefrom, the several arms are so fashioned that the cam rollers 73 of all arms lie in the same horizontal plane, which plane is substantially midway between the top and bottom of body member 50.

A uniformly accelerated motion cam 80 is keyed to shaft 40 at 81, the shaft extending upwardly between the arms of yokes 63, and the cam being positioned in horizontal alinement with the cam rollers 73 of all the rock arms, which positioning holds the rock arms so their shuttle rollers 77 are held in engagement with shoulders 65 of the blade-units.

It will be seen that shaft 40 is stationarily centered in the housing by bore 35, key 83 in way 37 establishing the position, as viewed in plan, of the shaft and hence of cam 80 with relation to the casing walls which define certain flow passages to be described. Inner race 85 of radial bearing 86 lies between the top of hub 34 (Fig. 1) and annular shoulder 87 on shaft 40. A longitudinal-split wedge cone 88 is entered in counterbore 36 about the shaft, the cone having a keyway 89 to accommodate key 83, and nut 90 is threaded on the end of the cam shaft and turned up against wedge cone 88, forcing it tightly into counterbore 36 and bringing shoulder 87 tightly against race 85, thus tying the cam shaft rigidly in centered position with respect to base 13 and barrel 11.

A lock washer 91 may be interposed between the cone and nut, with one locking lug 92 turned into keyway 89 and another locking lug 93 turned against a side face of the nut. Suitable clearances 94 and 95 are provided to prevent premature shouldering of the shaft-holding assembly, and to permit subsequent take-up of that assembly should occasion therefor subsequently arise. A protective cap 96 is bolted to the underside of the base to protect nut 90 and the end of the cam shaft, and also to seal off fluid which may leak through the cone-splits.

Cam 80 is held in engagement with an integral, upwardly facing shoulder 97 provided on cam shaft 40.

When cover 12 is placed in position, its underface 18 engages annular shoulder 98 of the cam shaft, and a nut 99 is threaded on the end of that shaft (which projects through and to a point above cover 12) to take the cover tightly down onto shoulder 98. Thus, the cam shaft with its nuts and shoulders, serves as a tie from cover to base at the center of the meter, giving obvious structural advantage, particularly where relatively high internal fluid pressures may develop.

The outer race of radial bearing 86 has sliding fit within bore 113 provided in hub 114 of detachable rotor-cap 115. A compression spring 112 within bore 113 is interposed between bearing 86 and the inturned flange 111 on the hub, serving automatically to take up bearing-wear and to maintain bearing 86 always in a condition to prevent radial displacement of the lower end of the rotor and thereby preserves predetermined radial clearance between the rotor elements and opposed walls of the casing. Spring 112 also permits limited vertical movement of cap 115 along shaft 40 when the rotor, proper, is moved along that shaft either by adjustment or vertical jar, as will be described.

Rotor cap 115 is preferably conical, sloping outwardly and downwardly from hub 114, and is provided near its outer edge with drainage ports 116 whereby foreign matter from within the rotor may drop into settling chamber 21. The cap has an annular flange 117 provided with four radially extending slots 118 (Figs. 12 and 13) which are adapted to register with slots 52 in flange 48 of member 41. The conical nature of the cap and the downwardly extending annular flange 115a thereon (Fig. 1) serve, when the cap is applied to the rotor, to stiffen the rotor structure in a manner effectively to resist relative displacement of the sections of the split rotor body.

On opposite sides of slots 118, are arranged press-fitted pins 120 (Figs. 12 and 13) these pins extending through flange 117 and its annular groove 121 into registering holes in flange 48. Flange 117 also has a counter-groove 121a concentric with groove 121.

Figure 13:
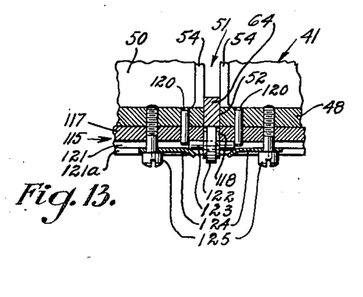
Fig. 13 is a section on line 13—13 of Fig. 12.

Hardened rollers 122 (Figs. 1, 12 and 13) having rotational bearing on shafts 123, preferably by way of roller bearings 122a, are positioned in slots 118, shafts 123 lying within groove 121 and being held against longitudinal displacement by pins 120, as clearly shown in Fig. 13. Spring clips or retainers 124 are applied to the underside of cover 115 by screws 125 which extend into threaded engagement with flange 48, thus serving not only to hold the clips upwardly in position but also to hold the cover tightly in assembly with rotor body 41. The clips lie within and approximately fit counter-groove 121a, thus being prevented from accidentally rotating from beneath shafts 123. The clips are adapted to hold the shafts in such positions that they support the rollers in a position to be engaged by the lower edges of blades 62, the blades thus being anti-frictionally supported from beneath to contribute to their ease of shuttling movement, as will be described. It will be seen that the inward extensions 64 of the blades assure the roller-support of said blades even when they are in their positions of greatest projection, as at the left of Fig. 1. The rollers are preferably of such diameter that the lower edges of the blades are flush with the bottom face of flange 48 and hence with the lower end of the rotor body.

Pins 120 form a tie between cap 115 and annulus 41 at opposite sides of slots 51, serving to hold the slotted end of the annulus from spreading and thus definitely and permanently establishing the widths of said slots so that predetermined clearances between the slot walls and blades 62 are exactly maintained.

A radial and thrust bearing unit, generally indicated at 130 (Fig. 1) is provided between web hub 45 and shaft 40, as follows. A plate 131 is bolted at 132 to the hub and overlies hub-bore 46 within which are positioned radial bearing 133 and thrust bearing 134. The outer race of bearing 133 has sliding fit in the hub-bore, compression spring 135 imposed between plate 131 and the bearing serving automatically to take up bearing-wear, thus acting constantly to support the upper end of the rotor and its elements in a manner to preserve predetermined radial spacing between them and the meter casing.

Plate 131 carries an integral, annular pinion 136 on its upper side, while thrust bearing 134 is interposed between its lower face and radial bearing 133. Shaft 40 extends with annular clearance through the upper race of bearing 134 and the bore of pinion 136, the lower race of bearing 134 resting on top the inner race of bearing 133.

The inner race of bearing 133 rests on a collar 138 which is vertically slidable on shaft 40, the collar, in turn, being resiliently supported by compression spring 38 surrounding the shaft. The lower end of spring 38 seats on cam 80, which cam, from this aspect, represents an upwardly facing shoulder on the shaft. With the above cooperation existing between the several bearing and rotor elements, it will be seen that the entire rotor is vertically and resiliently supported by spring 38, and thus resiliently supported and capable of relative vertical movement with respect to casing 10.

The opposite ends of blades 62 and of rotor annulus 41 are accurately machined to allow for slight clearance, indicated at K, between those ends and opposed housing faces 18 and 19. In the drawings the clearances are exaggerated, as is true of all other clearances indicated, in order that they may show up in the relatively small-scale drawings.

The mechanism to be described is provided for the accurate vertical adjustment of the rotor annulus and its blades to locate them properly with respect to faces 18 and 19 and to preserve that relationship in spite of the constant tendency of spring 38 to urge the rotor assembly upwardly. For instance, in giving this description it will be assumed that the rotor and the blades are .010" shorter than the distance between faces 18 and 19 and that it is desired that the rotor finally be positioned so there is .005" between each of its ends and the respective opposing faces 18 and 19, it being understood that this particular dimensioning, while giving satisfactory results, is not to be considered as in any way limitative on the invention but is given merely for the purposes of illustration.

Figure 9:
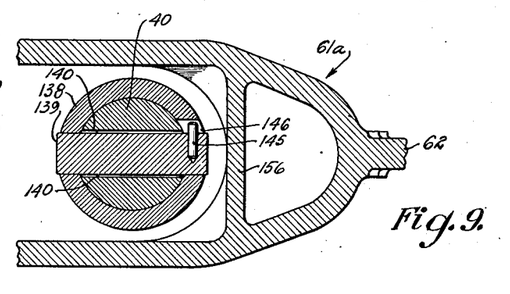
Fig. 9 is an enlarged fragmentary section on line 9—9 of Fig. 1.

Sliding collar 138 carries a cross-head 139 which is in the form of a cylindrical pin extending through a vertically elongated cross-slot 140 in cam-shaft 40 (Figs. 1 and 9). Intersecting slot 140 and extending therefrom axially of the shaft to the upper end thereof, is bore 141, the upper end of this bore being internally threaded at 142. A depressing plunger or actuator 143 extends through the smooth portion of the bore and projects into slot 140, where it bears at its lower end against pin or cross-head 139, the latter preferably being milled flat at 144 to receive the end of the plunger, the milling forming, in effect, a cross-head socket, and the seating of the plunger in this socket limiting longitudinal movement of the cross-head to prevent its horizontal displacement.

In order to hold cross-head 139 against rotation, which might otherwise carry flat 144 out of proper alinement with plunger 143, I provide said cross-head with a pin or key 145 (Fig. 9) which fits within the keyway or slot 146 of collar 138. Collar 138 and cross-head 139 may be considered as together making up a member slidable longitudinally of the shaft.

Figure 8:
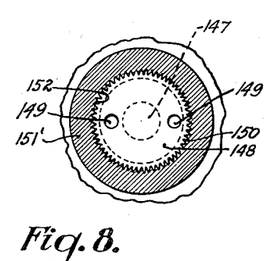
Fig. 8 is an enlarged fragmentary section on line 8—8 of Fig. 1.

Threaded in bore 141 at 142, is an adjusting or control plug 147 having a head 148 (Figs. 1 and 8) provided with spanner-wrench sockets 149 and a serrated or notched edge 150. A lock or jamb nut 151 is threaded on the plug against the end of the cam shaft. Nut 151 is adapted to co-act with the top of the shaft to take up any thread-looseness between the adjustment plug and the shaft and thus minimize leakage through the thread-joint.

It will be seen that spring 38 exerts a constant tendency to move collar 138 and hence (through the inner race of bearing 133 and through thrust bearing 134) to move the rotor with all its contained parts upwardly toward cover 12. The upward extent of this movement is limited by plunger 143 and adjustment plug 147, it being obvious that by unscrewing that plug, the spring is allowed to raise collar 138 and hence rotor R upwardly a corresponding distance, and that opposite movement of the plug depresses the sliding collar against the tension of spring 38 to allow the rotor and its parts to descend by gravity a corresponding distance. Thus, by proper manipulation of plug 147 it will be seen the rotor may be adjusted vertically within the housing (rollers 73 merely sliding vertically over the face of cam 80 during this adjustment) in order to give the desired clearances between housing faces 18, 19 and the opposite ends of the rotor and blades.

The extent of possible vertical movement of the rotor along the shaft is limited, prior to the inserting of the assembled rotor and shaft in the housing, by the vertical extent of slot 140, though it will be understood that when the rotor is assembled with the housing, cross-head 139 never reaches either end of the slot. When so assembled, the lower end of plunger 143 may be considered an adjustable stop for the cross-head and collar.

Figure 6:
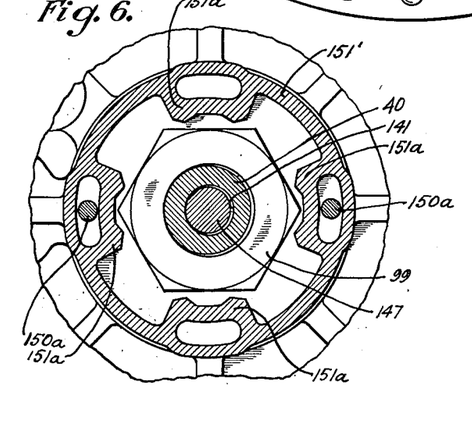
Fig. 6 is an enlarged fragmentary section on line 6—6 of Fig. 1.
Figure 7:
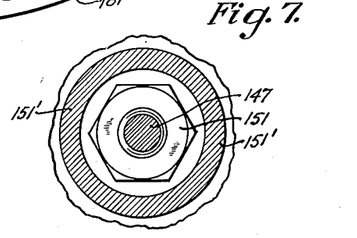
Fig. 7 is an enlarged fragmentary section on line 7—7 of Fig. 1.

Bolted to cover 12 at 150a and overlying the upper end of shaft 40 with its nuts 99, 151 and plug 147, is a cap 151' (Figs. 1, 6, 7 and 8) having internal lugs 151a (Fig. 6) and teeth 152 (Fig. 8) serving, respectively, to engage the corners of nut 99 and the notches 150 of head 148 to hold said nut and the adjustment plug in adjusted positions. The cap also serves as a protector for the elements housed therein, and preferably a gasket 154 (Fig. 1) is interposed between cover 12 and cap 151' to prevent leakage of fluid which may find its way into the cap-interior around the shaft or through its terminal bore.

Vertical adjustment of the rotor may be accomplished as follows. With cap 151' removed and nut 151 loosened, plug 147 may be backed out to an extent that will allow spring 38 to lift the rotor to a position where the upper end of the rotor-annulus 41 engages the under face 18 of cover 12. Plug 147 is then screwed down, in a manner to compress spring 38 sufficiently to allow the rotor to drop until its lower edge engages base-face 19, which condition may be determined by reaching through side openings 160 and 161 (Fig. 3) in body member 11 (the position of which openings will be later set forth) and noting the resistance set up when the rotor is thus turned by hand.

Threads 142 and notches 150 in head 148 are so related that the assembler can thereafter accurately set the rotor with predetermined clearances between it and the end plates of the housing. This is done by unscrewing plug 147 a predetermined amount. For instance, threads 142 may be twenty to the inch and there may be fifty notches in head 148, this example being given merely by way of illustration. Hence an angular movement of the plug equal to the extent of one fange-notch will move the plug longitudinally .001". Thus, the assembler may rotate plug 147 left-handedly (assuming threads 142 are right-hand) through the angle represented by five notches, allowing spring 38 to raise the rotor .005", thus creating a clearance of like distance between face 19 and the bottom of the rotor and lower edges of blades 62, still leaving a like clearance between face 18 and the top of the rotor and the upper edges of the blades, it being remembered that in the example given, a total clearance of .010" was assumed.

Nut 151 is then tightened and cap 151' is applied, with its teeth 152 engaged in notches 150 to hold the plug in adjusted position, it being noted in this connection that cap lugs 151a are sufficiently "coarse" to insure that their effective cooperation with nut 99 does not interfere with the proper engagement of teeth 152 with notches 150, irrespective of which individual teeth engage which individual notches.

It will thus be seen that the down-bearing load of blades 62 is imposed entirely on rotor body 41 and the down-bearing load of the rotor is taken on a thrust-bearing which is spring-supported from the stationary shaft and hence from the casing, all in a manner to maintain the blades and rotor body in predetermined, vertically spaced relation with the underlying wall 19 of the casing.

The arrangement just described is, of course, operative to effect re-adjustment of the rotor unit should need for same arise during subsequent operation.

With shaft 40 and its cam 80 centered in housing 10, with thrust bearing 134 taking the down-bearing load of the entire rotor and blade unit, and with radial bearings 86 and 133 interposed between the shaft and rotor, it will be seen that the rotor and its parts are mounted for exceedingly free rotation, though accurately held in proper alinement and spacing both vertically and radially with respect to all associated housing parts.

Cam 80 is, of course, held by shaft 40 stationary with respect to housing 10, and, since the opposed rollers 73 of each blade unit engage the cam at diametrically opposite sides, rotation of rotor body 41 causes shuttling of the blades, as will be described in detail later. However, due to the interposition of shuttle rollers 77 and blade supporting rollers 122, the resistance offered to this shuttling movement and hence to bodily rotation of the rotor is reduced to a minimum.

The mounting of rollers 73 and 77 on rock arms 69 and 69a contributes greatly to the smoothness and ease of rotor rotation and eliminates much wear and undesirable side pressure that would otherwise occur between the blades and the walls of the slots through which they reciprocate. The cam rollers 73 take the thrust of the cam, which thrust is transmitted through the rock arms and shuttle rollers 77 to the blade unit, but, as applied to a given blade unit, the thrust is only in the direction of its shuttling movement, that is, radially with respect to the rotor and hence with no side-thrust component.

It will be noted that rollers 77, through which the shuttling thrust is transmitted to the blades, are, on one pair of arms 69a, above the plane of cam 80 and, on the other pair of arms 69, are below that plane, in each case the rollers being located approximately in the horizontal plane in which lies the center of mass of the associated blade unit, it being noted that the yokes of the two units lie at opposite sides of cam 80. With this relationship existing there is eliminated any tendency for the blade units to tilt under thrust-load and cause contact and consequent wear between the blades and surfaces adjacent thereto. Not only is this elimination important from the standpoint of lengthening the actual life of the meter, but it is also important as a factor in preserving meter accuracy, for not only would this wear bring about an undesirable increase in certain relatively critical clearances, but also, during the period of contact causing that wear, a considerable and undesirable frictional hold-back on the rotor would result.

Since shoulders 65 are located immediately adjacent the yokes 63 which connect the blades of a given blade-unit, the tendency of rollers 77 to spring the blades apart is minimized, to obvious advantage. Preferably, the yoke arms are connected by cross ribs 156 (Fig. 9) to stiffen the yoke structure and give the blade-unit casting greater torsional resistance.

The wide spread of the rock arm lugs 70 (Figs. 10 and 11) with rollers 73 in planes substantially midway between those lugs, eliminates any undesirable deflection which might otherwise arise from the fact that the thrust load is transmitted from the rollers 73 in one plane and to rollers 77 in another plane.

It has been noted that rotor R is resiliently supported by spring 38 in predetermined, vertically spaced relation with respect to face 19. Consequently, if the rotor be exposed to a downward jar as may often be the case, particularly where it is mounted on a tank car or delivery truck, this jar as imposed on the rotor is absorbed by spring 38, the latter yielding to allow the rotor to descend through the slight clearance space between face 19 and the bottom of the rotor, thus relieving thrust bearing 134 from the solid shock to which it would otherwise be exposed.

If the shock be severe, the rotor may momentarily contact face 19, but even if this happens the shock is taken evenly over the entire under face of the rotor, the possible load transmitted to the ball thrust bearing being at all times limited to the spring pressure which is well within its capacity to withstand.

Figure 4:
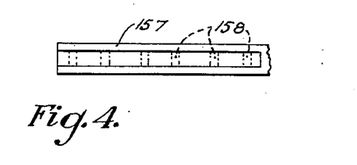
Fig. 4 shows the lower end of one of the rotor blades as viewed from beneath, at line 4—4 of Fig. 1.

Preferably, though not necessarily, hard-metal inserts 157 (Figs. 1 and 4) are cast into the lower, inwardly extending edges 64 of blades 62, providing wear shoes for engagement with ball-bearing rollers 122. The inserts have upwardly extending and spaced lugs 158 which are pierced as at 159 so, in casting the blades, the metal will run into the piercings and between the lugs to key the shoes solidly to the blades.

Now referring to Fig. 3, it will be noted that an annular flow channel, generally indicated at C, is defined by the inner wall of casing 10 and the periphery of rotor annulus 50. Opening to this channel are housing ports 160 and 161, these ports extending through bosses 162 adapted to take attachment fittings (not shown) whereby flow pipes may be applied to the meter. The meter is symmetrical and functions properly irrespective of the direction of fluid flow therethrough. Consequently either port may be utilized as inlet or outlet, but, for purposes of description, it will be assumed that the rotor is to rotate in a clockwise direction, and accordingly port 160 will be considered as the inlet and port 161 as the outlet. The size and shape of the ports may vary within wide limits, as long as certain fundamental relationships are preserved, as will be set forth later, and therefore the following description is not to be considered as in any way limitative on the invention except insofar as the claims may import.

Ports 160 and 161 are spaced apart approximately 90° and are elongated vertically so they are substantially of the same vertical extent as flow channel C. The ports are substantially arcuate as viewed in plan and their dimensions are such that, throughout their lengths, their cross-sectional areas are substantially equal to the cross-sectional area of the flow channel C, which latter is substantially of uniform cross-sectional area throughout. The significance of this relationship will be pointed out later.

Interposed in flow channel C at a point between ports 160 and 161 is a barrier block 163 (Figs. 1 and 3) consisting of an arcuate plate portion 164 held in annularly spaced relation with the housing by marginal flanges, the horizontal flanges being indicated at 165 and the vertical flanges being indicated at 166. The block is detachably held in position by screws 167 extending through barrel 11, though it will be understood the block may be considered as a part of the casing. The outer faces 168 of vertical flanges 166 are arcuate as viewed in plan-section, and fit along the edges 169 of the associated housing ports where they open to the housing bore. Flange faces 168 thus form smooth continuations of the adjacent wall faces 170 of the associated inlet walls, said faces and walls curving inwardly and face 168 being in a position to deliver fluid, at the inlet port, in such a direction that it more or less directly impinges against the rotor at I, where, due to the described curvature of the inlet faces (of which 168 may be considered a part) the pressure of the fluid is increased at this area of impingement, while, at the outlet side, the pressure adjacent the rotor is relatively reduced, resulting in a pressure-differential that tends to increase slippage across the ends of the rotor from inlet to outlet.

Now it will be seen that fluid slippage from inlet to outlet is not only proportional to the pressure differential between ports but is also proportional to the time element. For instance, in passing 100 gals. if the flow rate be 50 gals. per minute, there are two minutes during which slip may occur. If the flow rate be 100 gals. per minute, the time for slippage is reduced to one minute. It is therefore desirable to increase the slippage at high flow speeds, for the naturally greater pressure differentials which then exist are not sufficient to produce the necessary amount of increased slippage. The provision set forth above for increasing the slippage by virtue of the curved inlet and outlet walls and the more or less direct impingement of the fluid on the rotor, accomplishes the desired end.

The face of block 163 is recessed from top to bottom to provide a clearance passageway 171 between the rotor and the block. This recession leaves vertically extending lugs 172 and 173 at the end of the block, which lugs are spaced apart slightly less than 90° and establish diminished clearance passageways 174. Taken together, passageways 171 and 174 will be considered a "return" or corrective passageway P, the significance of which will be pointed out later.

Block 163 has a pair of horizontal ribs 163' between flanges 165 and has a pair of ports 171' and 172' extending through portion 164, both these ports opening to space 173' between the plate portion 164 and housing annulus 11, port 171' being immediately below upper flange 165 and port 172' being approximately midway between the lower rib 163' and the bottom flange 165. These ports prevent the trapping of air in passageway P, and solid foreign matter, which may find its way into that passageway along with the fluid, is free to pass through the ports into space 173' where it settles out, the space thus serving as an auxiliary settling chamber.

Diametrically opposite block 163, the inside of the housing wall is accurately machined at 175 (Fig. 3) throughout an angular extent of a little more than 90°, this portion of the wall and the opposite wall of the rotor annulus defining the sides of measuring chamber M which is, of course, a part of flow channel C. The measuring chamber is defined at top and bottom by faces 18 and 19, and at its ends by any two adjacent rotor blades when they are both within the limits of face 175. The dimensions of the measuring chamber are such that its volumetric capacity will have a known value to which a meter counter or register may be accommodated by operation, for instance, through a properly calculated gear train to register in any chosen unit of measure.

Cam 80 is so located that, upon rotation of the rotor, a given blade is projected to its furthest extent a few degrees before it reaches the measuring chamber, the opposite blade of that unit simultaneously reaching its position of full retraction (preferably a little below the peripheral face of the rotor to insure ample clearance with respect to the block-lugs 172, 173) just prior to reaching lug 172. The cam rollers 73 of that unit then ride over cam dwells 176 and 177 which maintain the blades in their respective positions of full projection and retraction until just after they leave the measuring chamber and lug 173, respectively. The path of a given blade during one revolution of the rotor is indicated in dotted lines G in Fig. 3.

With the described relationship of wall 175, abutment wall 164 and ports 160 and 161, it will be seen that casing 10 may be considered as having oppositely disposed segmental cylindrical walls of different radii with inlet and outlet ports intermediate the ends of said wall.

The rotor blades during their passage through measuring chamber M, preferably slightly clear the defining walls of that chamber, the rotor clears lugs 172, 173, and the side walls of the housing are cut back between the measuring chamber and ports 160, 161 as at 178, there consequently being no metal-to-metal contact to cause a frictional drag on the rotor. It has been previously made apparent that due to the cam rollers, shuttle rollers and blade-supporting rollers, together with their particular dispositions, there is little resistance offered to rotor movement by the internal mechanism thereof. It follows that the rotor is capable of smooth and easy rotation under the slightest of impulses, a factor of great importance, as will be realized.

Before proceeding to a brief description of the register drive, I will discuss the functioning of the assembly so far set forth, for it will be realized that this does not depend upon particularities of that drive. However, for purposes of immediate reference, a registering mechanism will be designated generally at S (Fig. 1) it being understood preliminarily that register S is operated by virtue of rotor movement.

When the meter is initially connected with a source of fluid under pressure, plug 180 in cap 12 (Fig. 1) is temporarily removed to permit the escape of air which may be trapped in the upper part of the housing.

As the fluid flows through inlet 160, it is guided by the smoothly curving walls of the inlet passageway and wall 168 into flow channel C. In its passage, the fluid acts against such rotor blades as are in its path in a manner to cause rotor rotation which, in turn, shuttles the blades in the manner previously described.

The feature of maintaining the inlet and outlet and the flow passage C of substantially uniform cross-sectional area throughout (though they may vary in shape at different points in their extents) allows the maintenance of a substantially constant flow-velocity through the meter, the measuring of the fluid being accomplished without stopping or retarding the flow and therefore without wasting head energy.

With it resulting that there is no substantial differential in pressure from inlet to outlet, the tendency toward variational fluid-slippage is reduced to a minimum, and consequently the rotor movement may correspond very nearly exactly to the fluid flow, and the rotor is capable of operating under extremely low pressures.

Due to the mounting and association of the various moving parts, as explained above, but little resistance is offered to rotation of the rotor and therefore but little resistance is offered to flow of fluid through the meter. In this connection it is to be noted that, since the blades are being bodily carried in the direction of fluid flow and at practically the same velocity thereas, said blades do not, by virtue of radial-movement through the fluid stream to their projected positions, appreciably retard the passage of the fluid from the inlet to the measuring chamber.

Cam 80 being of the uniformly accelerated motion type, accomplishes the shuttling movement of the blades in the manner best adapted for smooth, even, shockless operation.

Centrifugal force tends to hold each blade successively outward as it is extended beyond its central position, thus holding the associated cam roller firmly in contact with the small-radius dwell 177 during movement of the given blade through the measuring chamber. This insures that the blade will clear measuring-chamber wall 175 by a predetermined extent as at L (Figs. 1 and 3) in spite of lost-motion or play in the mechanism, thus insuring predetermined slippage through the slippage clearances or channels and consequent accurate metering results.

The described nature of the cam and blade units, the free shuttling movement of the blades and the means for transmitting thrust from the cam to the blade unit, all contribute to the end that the energy transmitted to the blades from the rotor during their radial acceleration period is returned to the rotor during their radial deceleration period.

The face 19 of base 13 is recessed at 181, the recesses starting at points opposite the inlet and outlet ports and terminating in substantially square-cut, vertical shoulders 182 adjacent the ends of measuring chamber M. Sand or other extraneous matter in the fluid drops into the recess at the inlet side of the meter, and any matter which may have a tendency to adhere to the under edge of the blade will be scraped off by shoulder 182 and drop into the recess, thus preventing scoring of the floor of the measuring chamber or damage to the ends of the blades, and eliminating frictional drag or jamming which might otherwise occur.

There will be some slippage of the fluid through channels defined by internal housing faces and the opposed faces of the rotor and blades, and consequent leakage into the interior of the rotor, though, during operation of the meter, slippage through slots 51 into the rotor is reduced to a minimum since the blades, as they enter the fluid body, are being projected in a direction tending to counteract such slippage flow. Openings 53 and 116 in web 42 and cap 115, respectively, put the space above the rotor web and the interior of the rotor into communication with the settling chamber 21, and, assuming gasoline is the fluid being metered, water present in the fluid may be occasionally drained by removing plug 28b (Fig. 1).

Such fluid as slips past the blade or across the ends of the rotor (and which may be considered as passing from inlet to outlet through slippage channels K and L defined by the opposed and spaced walls of the casing and rotor elements) is, of course, unmeasured since it is not represented by an effective impulse on the rotor blades, and therefore it is unregistered on the registering mechanism operated by that rotor. However, the provision of return passage P compensates, at least in part, for this inaccuracy. That is, a certain amount of fluid clings to the outer peripheral wall of the rotor as it passes from the measuring chamber, and, rather than being delivered through the outlet, part of this fluid is carried by fluid wall-friction or cleavage through return passageway P and is thus returned to the inlet side of the flow passage whence it passes again to the measuring chamber, it being noted that the direction of fluid-travel through passageway P is opposite to that naturally expected by reason of the pressure at the inlet of the flow channel.

Now the fluid which is thus returned to the measuring chamber has been previously measured and indicated on the meter register in spite of the fact that it was not delivered through the outlet, and thus represents measured but undelivered fluid, hence having the effect of compensating for or balancing slippage fluid which has been delivered, but has not been measured. This effect may be expressed as the compensation for slippage past the blades by return of fluid past the barrier block.

The amount of return flow depends upon the clearance between the rotor and lugs 172, 173, which, in effect, cut down, to a predetermined dimension, the thickness of the film of fluid adhering to the rotor, and the parts are proportioned and relatively positioned to give a clearance which will most nearly compensate for the average slippage of the average meter, as determined by test. For instance, where the blades clear the arcuate wall of the measuring chamber by .001", it is found that a clearance of .002" between the rotor and lugs 172, 173 allows such return flow as will approximately compensate for the slippage arising from the specified blade clearance. Of course, these dimensions are given merely by way of example and are not to be considered as limitative. It has been found by repeated tests that the compensation effected by the return flow acts as described irrespective of the angular velocity of the rotor.

At 185 is indicated a cap bolted at 186 to cover 12, the space between cover and cap representing a gear box indicated at 183. Cap 185 has a depressed central portion 187 through which extends a shaft 188 carrying gears 189 and 190 at opposite ends thereof. Cap 185 supports the registering mechanism generally indicated at S and, since this mechanism may be of any suitable type, it is indicated merely conventionally, but it will be assumed that it is driven from gear 189 through the drive mechanism indicated generally at 191. Register housing 192 has windows 193 whereby the registering mechanism may be viewed.

Considered broadly, the drive from rotor pinion 136 to gear 189 may be accomplished by any suitable gear train which will properly coordinate the rotor movement (considering its predetermined capacity per revolution) with the registering mechanism, but preferably, as shown, the drive is accomplished through a train of "change-gears" generally indicated at 194, whereby the drive to the register mechanism may be varied to compensate for individual characteristics of a given meter. For the purpose of the present application this "change-gear" assembly need not be described in detail (as it is in said copending application) but the opposite ends of the train are indicated at 195 and 196, gear 195 being meshed with gear 190, and gear 196 being driven from shaft 197 which extends through stuffing box 198 in cover 12.

Fixed to the lower end of shaft 197 and lying between web 42 and cover 12, is a gear 199 which meshes with rotor gear 136. A thrust bearing 200 is interposed between the hub of gear 199 and the underside of cover 12, while a port 201 is cut through the gear so, in case the gear-flange 202 should engage the under face of cover 12, fluid will be admitted above the gear substantially to equalize the fluid pressure above and beneath the gear and thus prevent it from binding against the cover.

It will be evident that rotation of the rotor will cause register operation through pinion 136, gear 199, shaft 197, change gears 194 (from gear 196 to gear 195) gear 190, shaft 188, gear 189 and mechanism 191.

It will be understood various changes in design, structure and arrangement over that herein illustrated and described, may be made without departing from the spirit and scope of the appended claims.

I claim:

1. In a fluid flow mechanism, a casing embodying a barrel with its axis extending vertically and end walls closing the bore of the barrel, said casing having inlet and outlet ports opening to a flow channel defined within the casing, a vertical shaft supported within the casing, a rotor mounted on the shaft for rotation thereabout and movable vertically therealong through a predetermined range, said rotor having blades adapted to extend into said flow channel, a spring tending to urge the rotor vertically upwardly through said range, and adjustable means limiting the extent of spring-actuated movement.

2. In a fluid flow mechanism, a casing embodying a barrel with its axis extending vertically and end walls closing the bore of the barrel, said casing having inlet and outlet ports opening to a flow channel defined within the casing, a vertical shaft stationarily supported within the casing, a rotor mounted on the shaft for rotation thereabout and having its lower end vertically opposed to an interior wall of the casing, and spring suspension means on the shaft resiliently suspending the rotor from the shaft with the lower end of the rotor spaced from said opposing interior wall.

3. In a fluid flow mechanism, a casing embodying a barrel with its axis extending vertically and end walls closing the bore of the barrel, said casing having inlet and outlet ports openings to a flow channel defined within the casing, a vertical shaft supported within the casing, a rotor mounted on the shaft for rotation thereabout, blades mounted on the rotor and adapted to have substantially radial shuttling movement across the flow channel, the lower end of the rotor and the lower ends of the blades being vertically opposed to an interior wall of the casing, and spring suspension means on the shaft resiliently suspending the rotor and blades from the shaft with their lower ends vertically spaced from said opposing interior wall of the casing.

4. In a fluid flow mechanism, a casing embodying a barrel with its axis extending vertically and end walls closing the bore of the barrel, said casing having inlet and outlet ports opening to a flow channel defined within the casing, a vertical shaft supported within the casing, an upwardly facing shoulder on said shaft, a compression spring about said shaft and seated on said shoulder, a bearing assembly slidable along the shaft and supported by said spring, and a rotor body supported on said bearing assembly.

5. In a fluid flow mechanism, a casing embodying a barrel with its axis extending vertically and end walls closing the bore of the barrel, said casing having inlet and outlet ports opening to a flow channel defined within the casing, a vertical shaft supported within the casing, an upwardly facing shoulder on said shaft, a compression spring about said shaft and seated on said shoulder, a bearing assembly slidable along the shaft and supported by said spring, a rotor body supported on said bearing assembly, and means for controlling the effective lifting force of said spring.

6. In a fluid flow mechanism, a casing embodying a barrel with its axis extending vertically and end walls closing the bore of the barrel, said casing having inlet and outlet ports opening to a flow channel defined within the casing, a vertical shaft supported within the casing, an upwardly facing shoulder on said shaft, a compression spring about said shaft and seated on said shoulder, a bearing assembly slidable along the shaft and supported by said spring, a rotor body supported on said bearing assembly, and adjustable means applied to the spring for positively compressing it.

7. In a fluid flow mechanism, a casing embodying a barrel with its axis extending vertically and end walls closing the bore of the barrel, said casing having inlet and outlet ports opening to a flow channel defined within the casing, a vertical shaft supported within the casing, an upwardly facing shoulder on said shaft, a compression spring about said shaft and seated on said shoulder, a collar slidable on said shaft and seated on the upper end of said spring, a bearing assembly slidable along said shaft and supported on said collar, a rotor body supported on said bearing assembly, and means for depressing said collar against the action of said spring.

8. In a fluid flow mechanism, a casing embodying a barrel with its axis extending vertically and end walls closing the bore of the barrel, said casing having inlet and outlet ports opening to a flow channel defined within the casing, a vertical shaft supported within the casing, a hollow rotor body rotatably mounted on said shaft, a cam stationarily positioned within the body-hollow, a rotor blade extending radially through a slot in the rotor body and adapted to be projected periodically into the flow channel, a rock arm pivotally mounted on the body within its hollow, the rock arm being mounted independently of the blade, sad rock arm cooperating with the cam and blade whereby radial thrust is imparted to the blade by the cam by virtue of rotation of the body, and spring suspension means on the shaft resiliently suspending the rotor body and its blade from the shaft and in spaced relation with opposed, underlying portions of the casing.

9. In a fluid flow mechanism, a casing embodying a barrel with its axis extending vertically and end walls closing the bore of the barrel, said casing having inlet and outlet ports opening to a flow channel defined within the casing, a vertical shaft supported within the casing, a hollow rotor body rotatably mounted on said shaft, a cam stationarily positioned within the body-hollow, a rotor blade extending radially through a slot in the rotor body and adapted to be projected periodically into the flow channel, a rock arm pivotally mounted on the body within its hollow, said rock arm cooperating with the cam and blade whereby radial thrust is imparted to the blade by the cam by virtue of rotation of the body, spring suspension means on the shaft resiliently suspending the rotor body and its blade from the shaft and in spaced relation with opposed, underlying portions of the casing, and means for shifting said rotor body vertically along the shaft to vary the extent of such spacing and yet maintaining the spring suspension of the rotor and blade.

10. In a fluid flow mechanism, a casing embodying a barrel with its axis extending vertically and end walls closing the bore of the barrel, said casing having inlet and outlet ports opening to a flow channel defined within the casing, a central, stationary shaft extending through the casing bore and through said end walls, means on said shaft and cooperating with said end walls to hold said end walls from centrally spreading apart, a rotor rotatably supported on said shaft and having shuttle blades adapted to be periodically projected into said flow channel, spring suspension means on the shaft resiliently suspending the rotor and its blades with their lower faces in spaced relation with underlying interior walls of the casing, a gear on said rotor, a second gear in mesh with the first mentioned gear and located between the end of the rotor and one of said end walls, and a shaft for said second gear extending through said one end wall.

11. In a fluid flow mechanism, a casing embodying a barrel with its axis extending vertically and end walls closing the bore of the barrel, said casing having inlet and outlet ports opening to a flow channel defined within the casing, a vertical shaft supported within the casing, a rotor mounted on the shaft for rotation thereabout and movable vertically therealong, a spring tending to urge the rotor vertically upwardly along the shaft, and a stop limiting the extent of spring-actuated rotor movement.

12. In a fluid flow mechanism, a casing embodying a barrel with its axis extending vertically and end walls closing the bore of the barrel, said casing having inlet and outlet ports opening to a flow channel defined within the casing, a central, stationary shaft extending through the casing bore and through said end walls, means on said shaft and cooperating with said end walls to hold said end walls from centrally spreading apart, a rotor rotatably supported on said shaft and having shuttle blades adapted to be periodically projected into said flow channel, and spring suspension means on the shaft resiliently suspending the rotor and its blades with their lower faces in spaced relation with underlying interior walls of the casing.

13. In a fluid flow mechanism, a casing embodying a barrel with its axis extending vertically and end walls closing the bore of the barrel, said casing having inlet and outlet ports opening to a flow channel defined within the casing, a vertical shaft stationarily supported within the casing, a rotor mounted on the shaft for rotation thereabout and movable vertically therealong through a predetermined range, said rotor having blades adapted to extend into said flow channel, and means controllable from without the casing for moving said rotor within said range to a selected position, said rotor in all its positions of vertical adjustment imposing its down-bearing load on said shaft.

14. In a fluid flow mechanism, a casing embodying a barrel with its axis extending vertically and end walls closing the bore of the barrel, said casing having inlet and outlet ports opening to a flow channel defined within the casing, a vertical shaft supported within the casing, a compression spring about said shaft and having its lower end supported thereby, a collar slidable on said shaft and seated on the upper end of said spring, a rotor body supported on said collar and slidable therewith along the shaft, and means for depressing said collar against the action of the spring and thereby lowering the rotor along the shaft.

15. In a fluid flow mechanism, a casing embodying a barrel with its axis extending vertically and end walls closing the bore of the barrel, said casing having inlet and outlet ports opening to a flow channel defined within the casing, a vertical shaft supported within the casing, said shaft having an axial bore at one end, one end of the shaft bore being accessible from the exterior of one end wall and the other end of the shaft bore communicating with the interior of the casing, a collar slidable vertically on said shaft, a cross-head connected to the collar and extending through a radial opening in the shaft, which opening communicates with the axial bore, rotor body supported on said collar and slidable therewith along the shaft, and means for controlling the vertical position of the collar with respect to the shaft and including a plunger slidable vertically through the shaft bore and engaged with said cross-head, and adjustable means in the upper end of the shaft bore and actuatable from the exterior of said one end wall for establishing the upper limit of plunger movement.

16. In a fluid flow mechanism, a casing embodying a barrel with its axis extending vertically and end walls closing the bore of the barrel, said casing having inlet and outlet ports opening to a flow channel defined within the casing, a vertical shaft supported within the casing, said shaft having an axial bore at one end, one end of the shaft bore being accessible from the exterior of one end wall and the other end of the shaft bore communicating with the interior of the casing, a member supported by and slidable vertically with respect to said shaft, a rotor body supported on said member and slidable therewith along the shaft, and means for controlling the vertical position of the member with respect to the shaft and including a plunger slidable vertically through the shaft bore and engaged with said member, adjustable means in the upper end of the shaft bore and actuatable from the exterior of said one end wall for establishing the upper limit of plunger movement, and spring means coacting between the shaft and member to urge said member upwardly and thereby resiliently hold the plunger at its upper limit of movement as established by said adjustable means.

17. In a fluid flow mechanism, a casing embodying a barrel with its axis extending vertically and end walls closing the bore of the barrel, said casing having inlet and outlet ports opening to a flow channel defined within the casing, a vertical shaft supported within the casing, a rotor mounted on the shaft for rotation thereabout and movable vertically therealong through a predetermined range, spring means applied to the rotor in a manner tending to move the rotor in one direction through the range, and means controllable from without the casing for establishing the extent of such spring-urged movement.

18. In a fluid flow mechanism, a casing embodying a barrel and end walls closing the bore of the barrel, said casing having inlet and outlet ports opening to a flow channel defined within the casing, a shaft supported within the casing, a spring about the shaft and having in effect, one of its ends engaged therewith, a collar slidable on the shaft and engaged at one end with the other end of said spring, a rotor body slidable along the shaft and limited in its extent of sliding movement in one direction by said collar, and means for sliding said collar along the shaft against the action of said spring.

REUBEN STANLEY SMITH.

CERTIFICATE OF CORRECTION.

Patent No. 2,207,274.  July 9, 1940.

REUBEN STANLEY SMITH.

It is hereby certified that error appears in the printed specification of the above numbered patent requiring correction as follows: Page 8, second column, line 7, claim 3, for the word "openings" read --opening--; page 9, first column, line 9, claim 8, for "sad" read --said--; and that the said Letters Patent should be read with this correction therein that the same may conform to the record of the case in the Patent Office.

Signed and sealed this 10th day of September, A. D. 1940.

(Seal)

Leslie Frazer,
Acting Commissioner of Patents.